Figure 1:
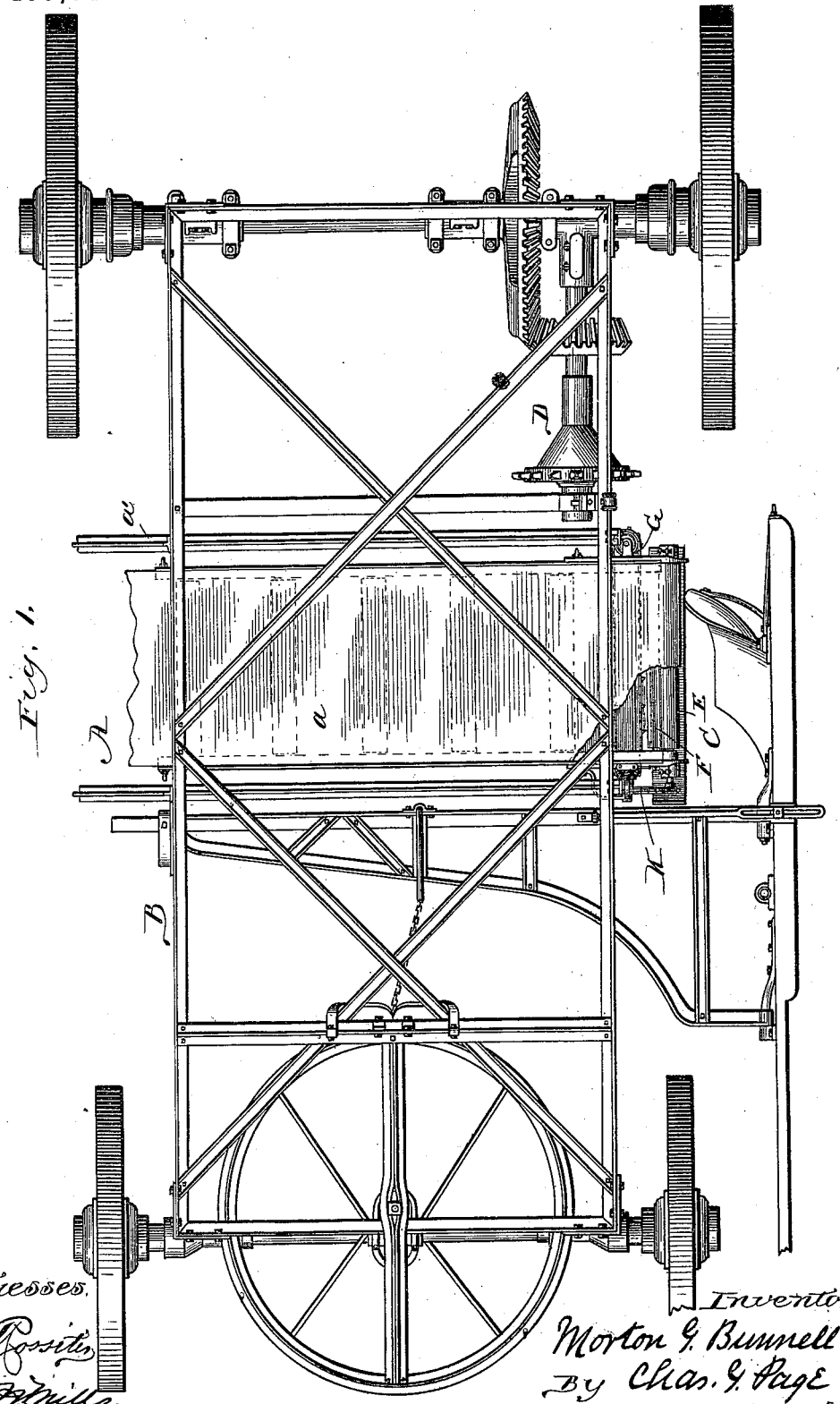

(No Model.) 2 Sheets—Sheet 1.

M. G. BUNNELL.
GRADING AND DITCHING MACHINE.

No. 403,035. Patented May 7, 1889.

Witnesses
W. Rossiter
F. H. Mills

Inventor
Morton G. Bunnell
By Chas. G. Page
Atty.

(No Model.)
M. G. BUNNELL.
GRADING AND DITCHING MACHINE.
No. 403,035. Patented May 7, 1889.
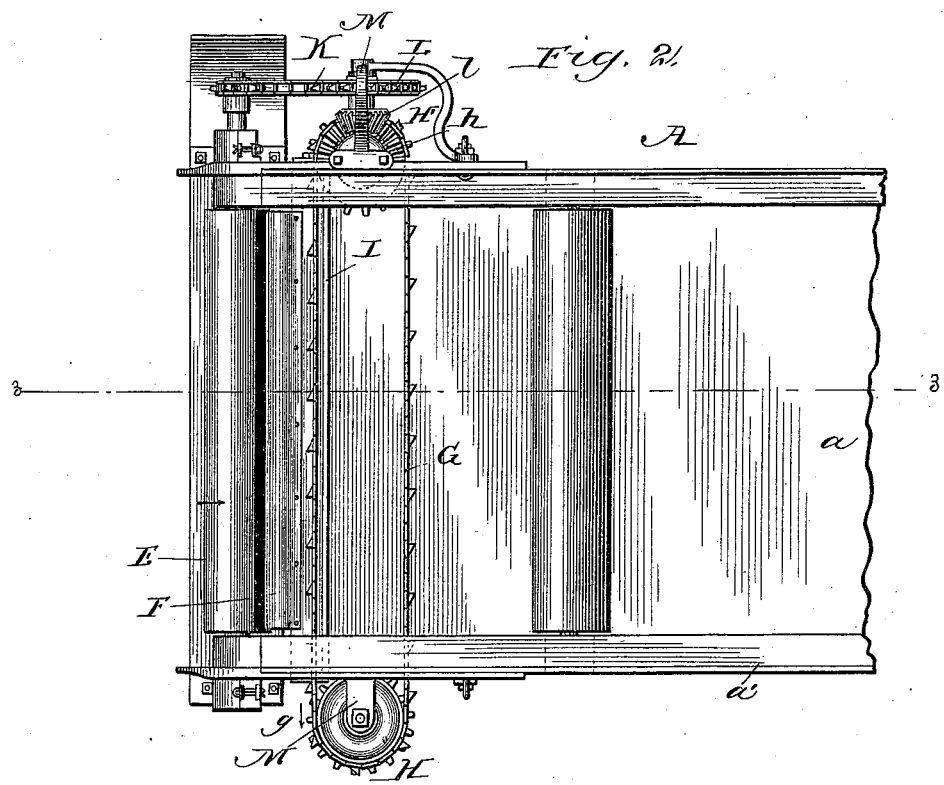
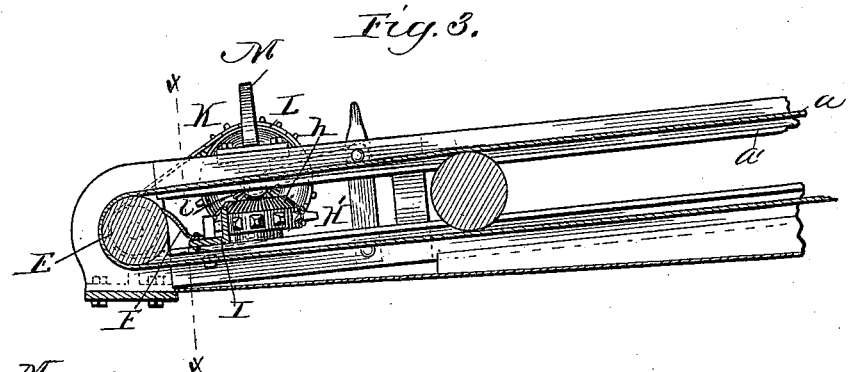
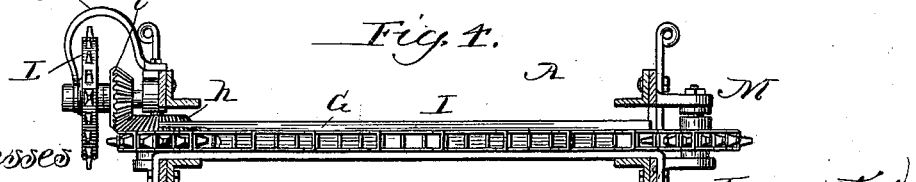
Witnesses
W. Rossiter
F. H. Mills
Inventor
Morton G. Bunnell
By Chas. G. Page
Atty.

UNITED STATES PATENT OFFICE.

MORTON G. BUNNELL, OF CHICAGO, ILLINOIS, ASSIGNOR TO FREDERICK C. AUSTIN, OF SAME PLACE.

GRADING AND DITCHING MACHINE.

SPECIFICATION forming part of Letters Patent No. 403,035, dated May 7, 1889.

Application filed January 24, 1889. Serial No. 297,447. (No model.)

*To all whom it may concern:*

Be it known that I, MORTON G. BUNNELL, a citizen of the United States, residing at Chicago, in the county of Cook and State of Illinois, have invented a certain new and useful Improvement in Grading and Ditching Machines, of which the following is a specification.

My invention relates to grading and ditching machines of that kind in which the soil is plowed up and delivered from the plow to an endless elevator apron or belt, which serves in turn as a means for conveying such plowed-up soil to a point where it is discharged.

During the operation of a machine of such character a considerable quantity of mud and loose soil will fall or be thrown upon the lower leaf of the endless elevator belt or apron, and during the travel of such belt the soil thus deposited upon its lower leaf will be carried to and compacted upon the belt-roll that is usually arranged at the receiving end of the elevator. The soil thus compacted upon said belt-roll must be removed therefrom, and to attain such end a scraper has been arranged between the folds or leaves of the conveyer-belt at a point where it may scrape the soil from the belt-roll.

The object of my invention is to provide means for automatically freeing the elevator from such soil as may have entered between the leaves of the elevator-belt, and particularly to carry off said scraped soil from the belt-roll by the scraper, whereby all clogging shall be avoided and the elevator relieved from the weight which prior to my invention has been incident to the accumulation in the elevator of soil scraped from the belt-roll.

A further object is to avoid all necessity for stopping the machine to remove dirt that has been scraped from the belt-roll.

In the accompanying drawings, Figure 1 represents a top plan view of the body-frame of a grading and ditching machine and certain matters which appertain to such machine and which are arranged below the said frame. In said view a portion only of the elevator is shown, and a portion of the endless elevator-belt is broken away for convenience of illustrating my improvement, which is applied thereto. Fig. 2 represents a top plan view of the receiving end portion the elevator with the upper leaf of the endless elevator-belt removed for convenience of illustration. Fig. 3 is a section on line 3 3, Fig. 2, but shows portions of both the upper and lower leaves of the endless elevator-belt. Fig. 4 is a section taken transversely through the elevator on a plane indicated by line 4 4 in Fig. 3.

In Fig. 1 I have shown the elevator A arranged in a grading and ditching machine that is organized substantially as in Letters Patent No. 394,908, heretofore granted me. It is understood, however, that I have herein selected such construction of machine merely with a view of illustrating the general application of an elevator in a grading and ditching machine, and that my improvement can be applied to any suitable constructions of elevator employed in any suitable or desired construction of grading and ditching machine. With reference, therefore, to the machine shown in Fig. 1, it will only be necessary to state that B indicates the wheeled body-frame; C, the plow by which soil is plowed up and delivered onto the endless elevator-belt $a$ of the elevator, and D a driving mechanism from which the endless elevator-belt is understood to be operated by suitable power-transmitting connection.

The frame $a'$ of the elevator can be constructed in any suitable way, and any suitable number of rolls can be mounted upon such frame, so as to properly support the endless elevator-belt. In the several figures of the drawings I have represented only the receiving end portion of the elevator, it being herein regarded as unnecessary to show the entire elevator, since the same will be readily understood by those skilled in the art. The endless elevator-belt, which is understood to pass about a roll at the delivery end of the elevator, also passes about a roll, E, at the receiving end of the elevator. As a means for freeing the roll from such soil as may be carried to and compacted upon it by the endless elevator-belt, I arrange between the leaves of the belt and alongside the roll E a scraper, F. Said scraper extends the length of the roll and is inclined, as best shown in Fig. 3, so that the soil that is scraped from the roll will slide down the upper inclined surface of the scraper. The soil which is thus freed from the roll is rapidly carried off by a continuously-operating conveyer, G, and discharged at one side of the elevator. The conveyer G operates simultaneously with the travel of the endless elevator-belt, and may, for the broader purposes of my invention, be constructed in a variety of ways—as, for example, it could be either a spiral bladed conveyer or an endless belt provided with conveying-fingers, and in all of such cases it could be driven in any convenient or desired way. As a special feature of improvement, however, I prefer an endless chain or link belt provided with laterally-arranged teeth or conveying-fingers and arranged to pass about sprockets H and H', mounted, respectively, at opposite sides of the elevator-frame. The said conveyer G is arranged transversely to the length of the endless elevator-belt $a$ and serves to take the soil that is scraped from the roll E and discharge the same at one side of the elevator. Where the conveyer G is formed by a link belt provided with gathering or conveying fingers the teeth of the sprocket H, while engaging in the links, will also free the same from any mud that may tend to adhere thereto.

In connection with the conveyer G, I prefer providing a sort of trough for receiving the soil scraped from the roll E, and for forming a guide or passage way along which such scraped-off soil can be readily carried by the conveyer G, without falling upon the lower leaf of the belt $a$.

As a simple means for forming such passage, I have herein provided upon the elevator-frame a transversely-arranged bent plate I, which, in conjunction with the upper inclined side of the scraper-blade, serves to form a trough or passage-way along which the endless conveyer G may travel. The conveyer is preferably driven from the roll E by some suitable power-transmitting connection—as, for example, by gearing—and to such end the sprocket H' is herein provided with a bevel-gear, $h$, and driven from the roll E by means of a short link belt, K, arranged to connect a sprocket on one of the roll-journals with a sprocket, L, on a spindle that is gear-connected with the gear $h$ by means of a bevel-gear, $f$.

The sprockets H and H' are mounted in bearings M on the elevator-frame, and preferably set somewhat out from the frame, whereby, when the conveyer is, for example, traveling in the direction of the arrow $g$ in Fig. 2, the soil taken by said conveyer will be freed therefrom and dropped clear of the elevator. The conveyer G could for certain purposes be arranged for clearing mud from the inner side of the endless elevator-belt $a'$, although I prefer the arrangement herein shown.

What I claim as my invention is—

1. The combination, substantially as hereinbefore set forth, with the elevator-belt in a grading and ditching machine, of a conveyer to carry off soil that has entered between the leaves of the elevator-belt.

2. The combination, substantially as hereinbefore set forth, with the elevator-belt and a roll about which it passes, of a scraper for removing soil from said roll, and a conveyer for carrying off the soil thus removed by the scraper.

3. The combination, substantially as hereinbefore set forth, with the elevator-belt, of a conveyer, G, consisting of an endless chain or belt provided with conveying teeth or fingers, for the purpose described.

4. The combination, substantially as hereinbefore set forth, with the elevator-belt and roll E, of the conveyer and gearing—such as set forth—for driving said conveyer from said roll.

5. The combination, substantially as hereinbefore set forth, with the elevator-belt and roll E, of the scraper F, conveyer G, and a plate forming in conjunction with the scraper a trough along which the said conveyer travels.

MORTON G. BUNNELL.

Witnesses:
CHAS. G. PAGE,
L. L. PAGE.